United States Patent
Lundgren

(10) Patent No.: US 8,693,447 B2
(45) Date of Patent: Apr. 8, 2014

(54) PROCESSING RESOURCE OPTIMIZATION IN COMMUNICATION SYSTEMS

(75) Inventor: Thomas Lundgren, Genarp (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 692 days.

(21) Appl. No.: 12/718,983

(22) Filed: Mar. 7, 2010

(65) Prior Publication Data

US 2011/0216715 A1 Sep. 8, 2011

(51) Int. Cl.
| H04W 4/00 | (2009.01) |
| H04J 3/00 | (2006.01) |
| H04B 7/212 | (2006.01) |
| H04L 27/26 | (2006.01) |
| H04W 56/00 | (2009.01) |

(52) U.S. Cl.
CPC ......... *H04L 27/2646* (2013.01); *H04L 27/2655* (2013.01); *H04W 56/004* (2013.01); *H04W 56/0045* (2013.01); *H04W 56/005* (2013.01)
USPC ........... 370/337; 370/329; 370/336; 370/345; 370/347

(58) Field of Classification Search
USPC ........................ 370/329, 336, 337, 345, 347
See application file for complete search history.

(56) References Cited

U.S. PATENT DOCUMENTS

| 7,499,417 | B2 | 3/2009 | Kim et al. | |
| 7,831,265 | B1* | 11/2010 | Shen et al. | 455/464 |
| 2005/0249148 | A1 | 11/2005 | Nakamata et al. | |
| 2007/0232318 | A1 | 10/2007 | Nobukiyo | |
| 2008/0002629 | A1 | 1/2008 | Roh et al. | |
| 2008/0069065 | A1 | 3/2008 | Wu et al. | |
| 2008/0130508 | A1* | 6/2008 | Vikstedt et al. | 370/241 |
| 2009/0122731 | A1 | 5/2009 | Montojo et al. | |
| 2009/0181687 | A1 | 7/2009 | Tiirola et al. | |
| 2009/0196363 | A1 | 8/2009 | Suda et al. | |
| 2010/0074204 | A1* | 3/2010 | Meylan | 370/329 |
| 2011/0176535 | A1* | 7/2011 | Lipka et al. | 370/350 |

FOREIGN PATENT DOCUMENTS

WO 2009/100651 A1 8/2009

OTHER PUBLICATIONS

S. Owicki et al., Factors in the Performance of the ANI Computer Network, Digital Equipment Corp., Jun. 15, 1992, pp. 1-30.
Nokia et al., On the Number of HARQ-Processes, R1-073673, TSG-RAN WG1 Meeting 5, Aug. 20, 2007, pp. 1-5, 3GPP, Athens, GR.

* cited by examiner

Primary Examiner — Ayaz Sheikh
Assistant Examiner — Tarell Hampton
(74) Attorney, Agent, or Firm — Potomac Patent Group PLLC

(57) ABSTRACT

Methods and apparatus for a user equipment (UE) of a communication system involve receiving a signal transmitted by a base station of the communication system; determining, based on the received signal, a timing advance, and a transport block size for a signal to be transmitted by the UE; and adjusting, based on the determined timing advance and the transport block size, at least one of the start of processing information for the signal to be transmitted by the UE and a size of a memory for storing processed information for the signal to be transmitted.

9 Claims, 6 Drawing Sheets

PROCESSING RESOURCE OPTIMIZATION IN COMMUNICATION SYSTEMS

TECHNICAL FIELD

This invention relates to radio communication systems and more particularly to increasing available signal processing time and reducing signal buffering in such systems.

BACKGROUND

Modern digital communication systems rely on transmitters and receivers that are synchronized with each other. In a cellular radio telephone system, user equipments (UEs), such as mobile phones and other remote terminals, are synchronized with network base stations (BSs), which can also be called nodeBs. Digital communication systems include time-division multiple access (TDMA) systems, such as cellular radio telephone systems that comply with the GSM telecommunication standard and its enhancements like GSM/EDGE, and code-division multiple access (CDMA) systems, such as cellular radio telephone systems that comply with the IS-95, cdma2000, and wideband CDMA (WCDMA) telecommunication standards. Long Term Evolution (LTE) can be seen as an evolution of the current WCDMA standard. Digital communication systems also include "blended" TDMA and CDMA systems, such as cellular radio telephone systems that comply with the universal mobile telecommunications system (UMTS) standard, which specifies a third generation (3G) mobile system being developed by the European Telecommunications Standards Institute (ETSI) within the International Telecommunication Union's (ITU's) IMT-2000 framework. The Third Generation Partnership Project (3GPP) promulgates the UMTS, LTE, WCDMA, and GSM standards, and specifications that standardize other kinds of cellular radio communication systems.

A BS transmits frequency correction and synchronization signals that enable a UE to synchronize itself to the BS and if necessary to correct the UE's internal frequency standard to be in line with that of the BS. The BS mainly providing service to a UE is usually called the UE's "serving" BS or cell. The timings of signal frames and time slots, which organize information conveyed between a UE and BS, are related to a common set of counters that run continuously whether the UE and BS are transmitting or not, and so after a UE has determined the correct setting of these counters, all its processes are synchronized to its current serving BS.

Characteristics of physical and transport channels (Layer 1) in the frequency-division-duplex (FDD) mode of a WCDMA cellular radio communication system are defined in 3GPP TS 25.211 V8.4.0, Physical Channels and Mapping of Transport Channels onto Physical Channels (FDD) (Release 8) (March 2009), among other specifications. In general, transport channels are services offered by Layer 1 (L1) to higher layers according to the OSI model and are defined by how data is transferred over the air interface between a BS and a UE. Dedicated channels use inherent addressing of UEs, and each of successive radio frames consists of fifteen time slots, with the length of a slot corresponding to 2560 chips, or ⅔ millisecond (ms). Each frame is also organized into successive subframes, each consisting of three slots, with the length of a subframe corresponding to 7680 chips, or 2 ms. A WCDMA communication system is described here, but it will be appreciated that other systems have equivalent features.

A UE times its transmissions to a BS in line with those received from the BS. The BS sends to each UE a timing advance (TA) parameter, which can be quantized as a number of symbols, that is based on the perceived round-trip signal propagation delay BS-UE-BS, or equivalently UE-BS-UE. The UE advances its transmission timing by the TA with the result that a signal transmitted by the UE arrives at the BS compensated for the propagation delay, i.e., at a time approximately independent of the distance between the BS and UE. Basically, this means that the UE is configured to transmit data earlier in time when it is far away from the BS compared to when it is close to the BS.

FIG. 1 is a plot of TA and transport block (TB) size as functions of distance between a UE and a BS. A transport block can be considered the basic data unit exchanged between L1 and medium access control (MAC) entities, or signal processing devices, in a UE, and the TB size is just the number of bits in a TB. The MAC layer is a sub-layer of Layer 2 (L2) that provides unacknowledged data transfer service on logical channels and access to transport channels, i.e., L1. FIG. 1 depicts, in a conceptual way, that as the distance to a BS increases, the TA increases, and the TB size decreases. From the UE's point of view, the time offset between the signal it transmits on the uplink (UL) to the BS and the signal it receives on the downlink (DL) from the BS changes as the TA changes.

In a communication system like a cellular telephone system, a UE processes its received signal in real time, which is to say that the digital processing procedures applied to each symbol or group of symbols of a received signal keep pace with the arrival of successive symbols or groups. Thus, in a real-time system, it is important to know the maximum runtime for each procedure in order to be able to set and evaluate deadlines for tasks that combine several procedures. For example, the electronic processing blocks in a UE that produce the baseband signal have to complete their processing by a specific deadline so that the baseband signal can be impressed on a carrier signal and the modulated carrier can be transmitted out on the UE's antenna at the right time. Some approaches to easing the time pressure on a UE are known. For example, U.S. Patent Application Publication No. US 2009/0122731 describes partially discarding a cyclic prefix of a last-received OFDM symbol as a technique for completing data reception earlier and switching to data transmission in a timely manner.

Because the TA, which is controlled by the serving BS, causes a UE to transmit data earlier when it is far away from the BS and later when it is close to the BS, the UE must take the TA into account in determining its processing deadlines. A larger TA leaves the UE with a smaller time period for processing its UL signal. For example, the time between a UE's receipt in the DL of an UL transmission grant and the time the UL data must be sent is greater for a smaller TA than it is for a larger TA, and as depicted in FIG. 1, the maximal bit rate in the UL (and the DL) decreases as the distance between the BA and UE increases. Many current communication system specifications do not define any relationship between TA and available UL bit rate.

SUMMARY

UEs and communication systems and methods in accordance with this invention overcome problems of current UEs, systems, and methods. Processing deadlines in a UE can be set to less than the sum of the involved procedures' maximum runtimes by using knowledge of the communication system.

In accordance with aspects of this invention, there is provided a method of controlling information processing in a UE for a communication system. The method includes receiving, in the UE, a signal transmitted by a BS of the communication system; determining, based on the received signal, a timing advance and a transport block size for a signal to be transmitted by the UE; and adjusting, based on the determined timing advance and the transport block size, at least one of the start of processing information for the signal to be transmitted by the UE and a size of a memory for storing processed information for the signal to be transmitted.

Also in accordance with aspects of this invention, there is provided an apparatus for controlling information processing in a UE for a communication system. The apparatus includes an electronic processor configured to receive a signal transmitted by a base station of the communication system; and an electronic processor configured to determine, based on the received signal, a timing advance and a transport block size for a signal to be transmitted by the UE, and to adjust, based on the determined timing advance and the transport block size, at least one of the start of processing information for the signal to be transmitted by the UE and a size of a memory for storing processed information for the signal to be transmitted.

Also in accordance with aspects of this invention, there is provided a computer-readable medium having stored instructions that, when executed by a computer, cause the computer to perform a method of controlling information processing in a UE for a communication system. The method includes receiving, in the UE, a signal transmitted by a base station of the communication system; determining, based on the received signal, a timing advance and a transport block size for a signal to be transmitted by the UE; and adjusting, based on the determined timing advance and the transport block size, at least one of the start of processing information for the signal to be transmitted by the UE and a size of a memory for storing processed information for the signal to be transmitted.

BRIEF DESCRIPTION OF THE DRAWINGS

The several features, objects, and advantages of this invention will be understood by reading this description in conjunction with the drawings, in which.

DETAILED DESCRIPTION

This description focusses on an LTE communication system for efficient explanation, but the artisan will understand that the invention in general can be implemented in other communication systems.

The inventor has recognized that it is possible to take advantage of the fact that, in current systems, the UE is not scheduled for the maximum UL bit rate when the UE is far away from the serving BS. In other words, an embodiment of this invention can exploit the fact that the maximum transport block size is not used at the same time as the maximum timing advance. Thus, a UE can use the available time for signal processing more efficiently, with the result that the UE design requirements can be less restrictive. For example, a UE need not include a large memory for storing a large part of its baseband signal until it is time to transmit as it need not produce data earlier than necessary.

Figure 1:
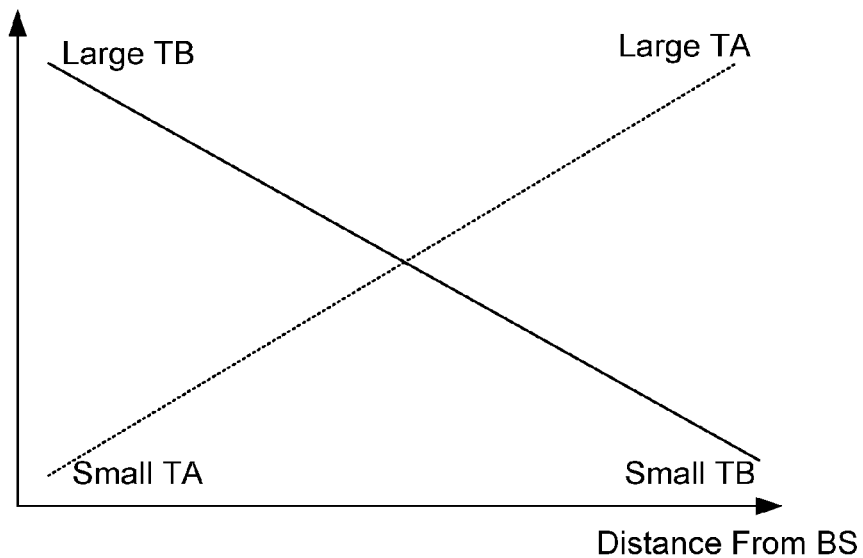
FIG. 1 depicts functional relationships of timing advance and transport block size to distance between a user equipment and a base station.
Figure 2:
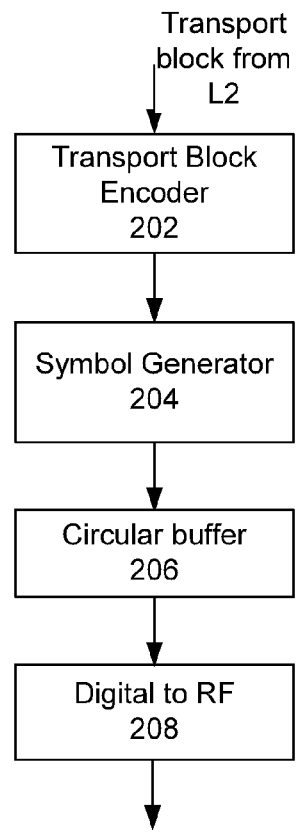
FIG. 2 is a block diagram of an uplink baseband processing chain in a user equipment.

FIG. 2 is a block diagram of UE's baseband (L1) processing chain 200 for the UL. The processing chain has two main parts: an encoder 202 that receives TBs from the UE's L2 entities (not shown) and encodes the received TBs, and a symbol generator 204 that generates from the encoded TBs symbols that will be impressed on the UL carrier signal. In an LTE communication system, the UL uses single carrier frequency division multiple access (SC-FDMA), but it will be understood that the other communication systems, such as WCDMA, can employ other multiple access techniques and the arrangement of FIG. 2 can be adapted accordingly. The processing chain 200 also includes a suitable buffer, or memory, 206, which can operate in a circular fashion as described below, and a circuit 208 that is configured to convert baseband digital data in the buffer 206 to radio frequency (RF) data that is provided to an eventual modulator and antenna (not shown). It will be appreciated that the processing chain 200 can be implemented by one or more application-specific integrated circuits, programmable digital signal processors, or equivalent logic circuits that are appropriately configured for the particular communication system.

In an LTE communication system, the encoding process carried out by the encoder 202 includes adding cyclic redundancy check (CRC) bits to each TB, Turbo encoding, and subcarrier interleaving, all of which contribute error prevention, detection, and correction for the transmitted UL signal. Among other things, the generator 204 scrambles the encoded TBs and maps the scrambled TBs into modulation symbols used by suppressed-carrier frequency division multiple access (SC-FDMA), which is the modulation format used in the UL of an LTE communication system. It will be understood that UEs in other communication systems include one or more devices that are equivalent to the encoder 202 and generator 204.

The encoder 202 works on a subframe basis, and so it must encode the maximum supported TB size in a time duration less than the duration of an UL subframe. In cellular communication systems like LTE and LTE-Advanced, a subframe has a duration of 1 ms, and the maximum supported bit rate can be fifty megabits per second (50 Mbit/s). Thus, the encoder 202 must process at most about fifty kilobits (50 kbits) in each subframe in such a system.

The symbol generator 204 works on a symbol basis, and must generate the required number of carrier-modulation symbols in a time duration less than the duration of an UL subframe. Exemplary cellular telephone systems use successions of subframes that each include, depending on configuration, fourteen or twelve SC-FDMA symbols that are eventually impressed on a carrier signal and then transmitted on the UE's antenna.

The UE's UL L1 processing chain 200 is typically implemented with the assumption of the longest possible UL processing time and the start of UL processing is set at one time instant that will be acceptable for all TA values. Despite the fact that the time needed by the L2 entities to generate each TB typically increases as the UL bit rate increases, the UL L2 processing must generate UL TBs by that one start time instant for all bit rates so that the L1 processing chain 200 is assured of completing its processing within the allowed time. Thus, when a UE is close to the serving BS (i.e., the TA is small) and is set for a high UL bit rate, the UE's L2 processing has to generate TBs just as fast as if the TA were set to the largest value. As a result, TB data encoded by the encoder 202 needs to be stored in the buffer memory 206 until it is time for it to be transmitted.

The amount of memory needed is related to the UL bit rate, the TA, and the data format (i.e., the number of bits in each sample of the in-phase (I) and quadrature (Q) TB data). In an LTE system, the UL bit rate for a given user is related to that user's allocation, and the cell bandwidth is divided among all allocated users in a subframe. For a maximum cell bandwidth of about twenty megahertz (20 MHz), the maximum TA, and a sample rate of 30.72 megasamples per second (Msample/s), the buffer 206 must be large enough to store at least 20512 samples for frequency division duplex (FDD) mode and 21136 samples for time division duplex (TDD) mode. Assuming each I and Q sample has eight bits, the required buffer size is at least 20512×16=328 kbits for FDD.

The artisan will understand that the 30.72-Msample/s sample rate is related to the 15-KHz spacing of 2048 possible subcarriers in LTE. The maximum number of carriers actually allocable is 110×12=1320, and 1320×15 KHz=19.8 MHz (about 20 MHz). A UE actually transmits on at most 96×12=1152 of the 15-KHz carriers, or one SC-FDMA symbol, with twelve data symbols in a subframe and two reference symbols. Assuming 16-ary quadrature amplitude modulation (QAM) of the subcarriers, each carries four bits, and so the total number of bits carried in a 1-ms subframe is 55296, which corresponds to an UL bit rate of about 50 Mbit/s. The total number of samples per subframe is 30720, and the maximum TA configuration is 20512 samples for FDD and (20512+624) samples for TDD.

Figure 3:
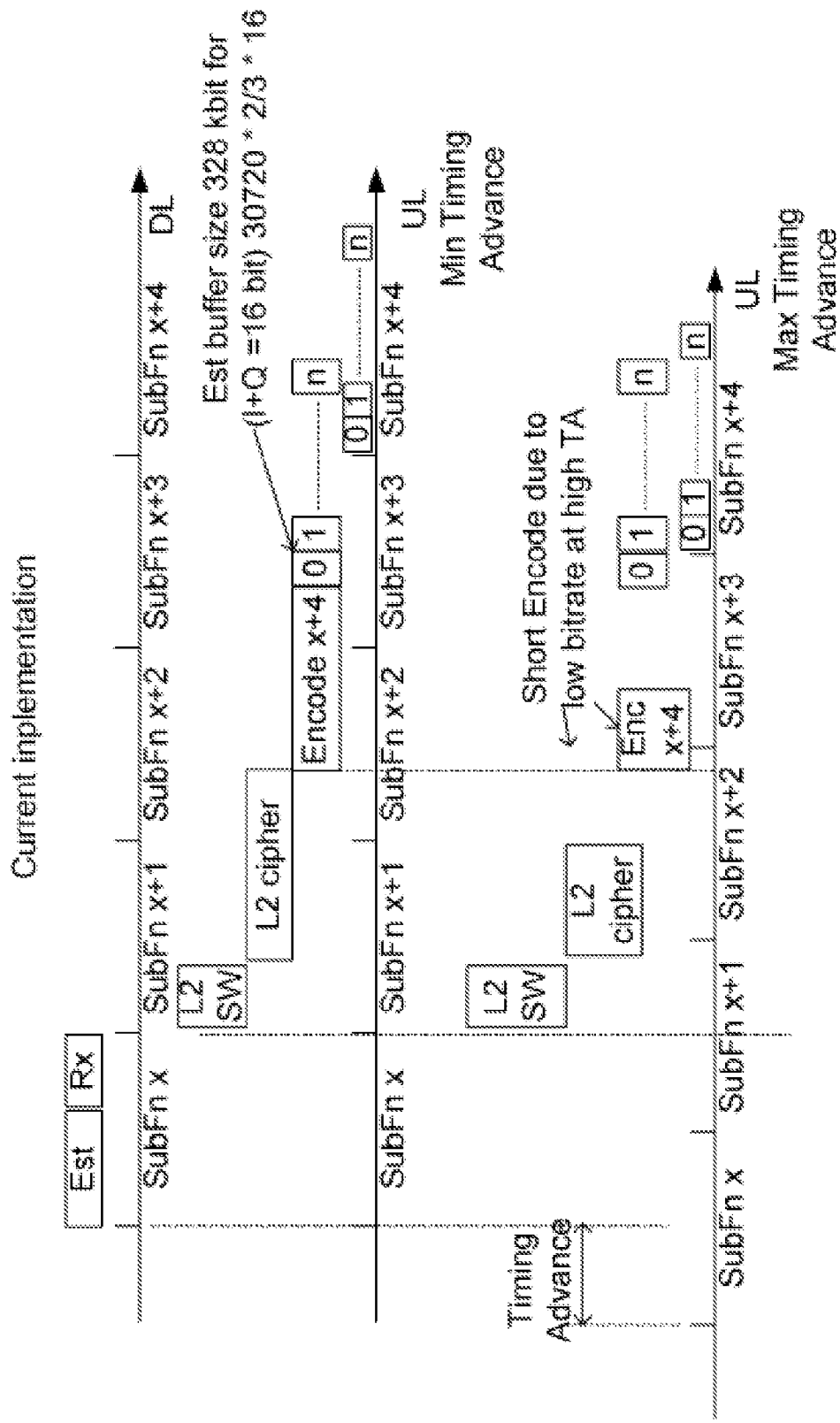
FIG. 3 illustrates typical subframe and processing timings.

FIG. 3 illustrates subframe and processing timings in a typical current implementation of an LTE communication system, where UL L1 processing is always started with the maximum TA and a smaller time is available for L2 processing. Shown at the top of the figure is a horizontal time line divided into a succession of downlink (DL) subframes x, x+1, ... for information transmitted by a BS. In the middle of the figure is a time line divided into a succession of UL subframes x, x+1, ... for information transmitted by a UE set with a zero, or minimal, TA (i.e., the UE is near the BS), and so the UL subframes are time-aligned with the DL subframes. At the bottom of the figure, the succession of UL subframes is displaced toward the left-hand side by the amount of the TA (i.e., the UE is far from the BS). In the DL, the box labeled Est represents time for channel estimation that has to be done by the UE before it can receive the BS's control channel information intended for the UE, and the box labeled Rx represents the position in the DL subframe x where the UE receives a grant message to transmit in UL subframe x+4.

A fixed time duration allotted to the UE's L2 entities for generating a TB that will be transmitted in the UL subframe x+4 is indicated by the pair of vertical dashed lines that include DL subframes x+1 and x+2. In general, the L2 entities' software (SW) executes in the early part of that time duration and the result is enciphered in the later part of that time duration according to the applicable system specification. It will be noted that when the TA is low (and the UL bit rate is high), the L2 entities use all of the allocated time to generate a TB as depicted by the middle of FIG. 3, but when the TA is high (and the UL bit rate is low), the L2 entities generate the TB with time to spare as depicted by the bottom of FIG. 3.

As described above and as depicted in the middle and bottom portions of FIG. 3, the encoder 202 encodes the TB and then the symbol generator 204 produces the appropriate number of modulation symbols. The start of encoding by the encoder 202 in the typical current implementation begins at the same time for low and high TA, although encoding requires less time (due to the fewer bits to be sent at the lower bit rate) in the high-TA case than it does in the low-TA case. As noted above, this kind of typical implementation requires a large buffer memory for L1 data and unnecessarily limits the time available for L2 generation of TBs.

The invention recognizes that the starting time for the UL L1 processing chain 200 can be set to a later time enabling more time to be allocated to L2 processing because the maximum possible run time for the UL L1 processing chain is not needed for the larger TAs. The starting time for L1 processing and the time allotted to L2 processing can be adjusted according to the decrease of the bit rate with increasing UE-BS distance. It is currently believed that the bit rate decreases more or less exponentially with increasing distance. For example, this invention can be implemented to support the maximum UL bit rate up to a certain distance, such as the distance that corresponds to a timing advance of one symbol, from the BS. As a result, more time is guaranteed for L2 than if the maximum bit rate would have been supported at maximum timing advance.

Figure 4:
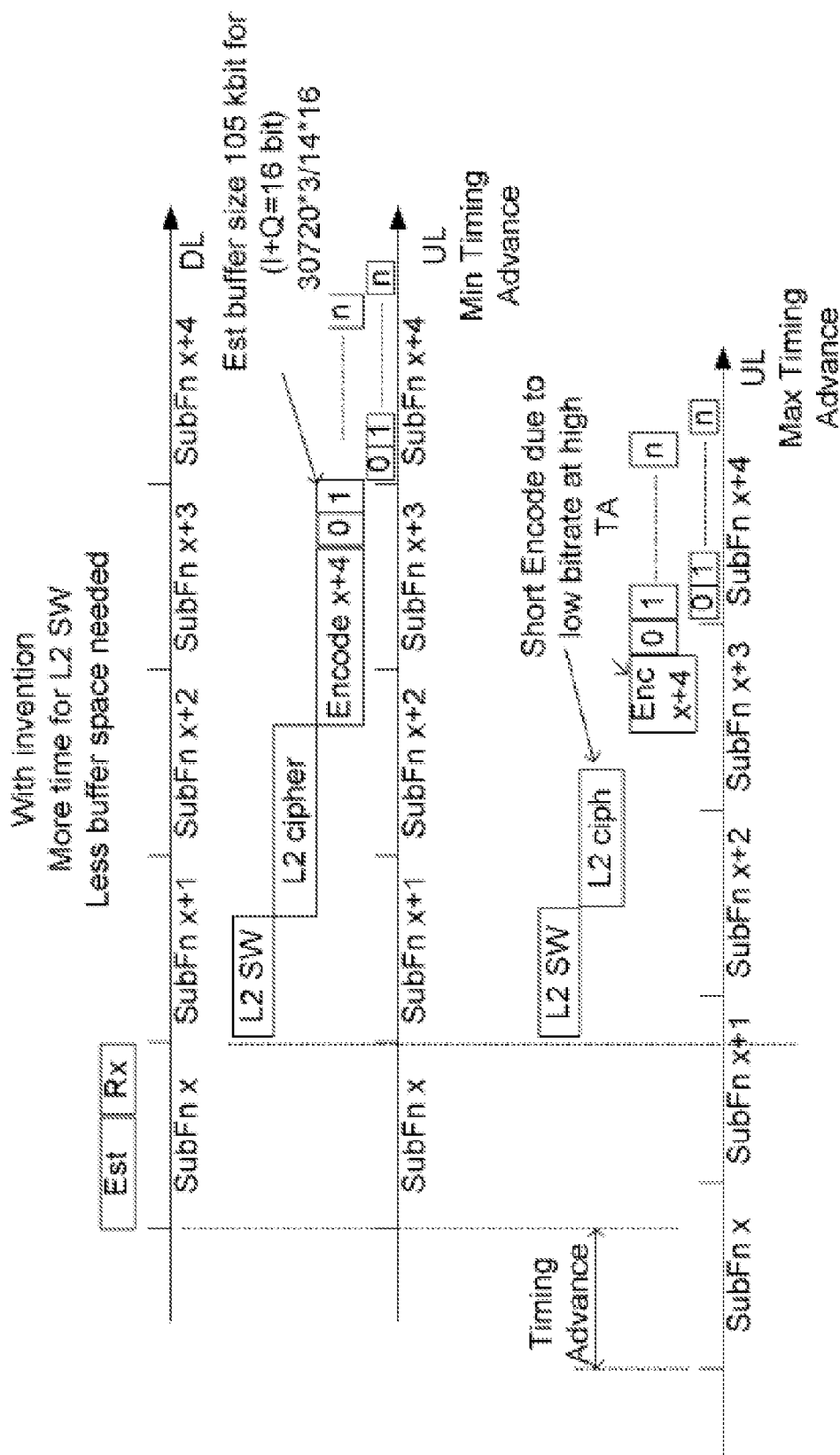
FIG. 4 illustrates subframe and processing timings in accordance with this invention.

FIG. 4 illustrates subframe and processing timings in an implementation of an LTE communication system according to this invention. As in FIG. 3, FIG. 4 shows at the top a horizontal time line divided into a succession of downlink (DL) subframes x, x+1, ... for information transmitted by a BS. In the middle of FIG. 4 is a time line divided into a succession of UL subframes x, x+1, ... for information transmitted by a UE set with a zero, or minimal, TA (i.e., the UE is near the BS), and so the UL subframes are time-aligned with the DL subframes. At the bottom of FIG. 4, the succession of UL subframes is displaced toward the left-hand side by the amount of the TA (i.e., the UE is far from the BS). The DL boxes labeled Est and Rx are as in FIG. 3.

Comparing FIGS. 3 and 4, it can be seen that the end of L2 processing and the start of L1 processing are later in FIG. 4 than it is in FIG. 3 because the maximum possible run time for the UL L1 processing chain is not needed for large TA. In many communication systems, including an LTE system, the TA is signaled to the UE by the BS with an UL grant message. As a result of the non-maximum TA, FIG. 4 shows that more time is available for L2 processing. Moreover, for a maximum cell bandwidth of 20 MHz and a sample rate of 30.72 Msample/s, the buffer 206 in a UE implementing this invention need be large enough to store only about 6594 samples, and so can be only 105 kbits, assuming each I and Q sample has eight bits.

The high TA depicted at the bottom of FIG. 4 corresponds to the UL signal shifted at most one symbol ahead of time, which in an LTE systems will enable full service at a UE-BS distance of five km, which corresponds to about half a symbol. One extra symbol is added in order to let the symbol generator 204 create a signal at the same time as the previous symbol is transmitted. The last main step in an SC-FDMA modulator is an inverse fast Fourier transform (IFFT), and so it is convenient to create a full extra symbol. It will be appreciated that the upper part of FIG. 4 shows the UE transmitting at the maximum bit rate with the minimal or zero TA, and it can be assumed that the UE is allowed to transmit at the maximum bit rate even at some distance (i.e., TA>0) from the BS. The figure is drawn such that the maximum encode time can be handled when the TA is less than or equal to one symbol, which has a duration of about 71 microseconds (μs), corresponding to about 21.4 km. Hence, one symbol covers a UE-BS distance of 10.7 km.

The invention can be embodied in many different forms for many different purposes. For example, the processing time between a UE's reception of an UL grant and the start of UL processing can be made longer for all cases. This can be used to relax the timing requirement on L2, which has to produce data for the L1 encoder in a short time. In a typical UE, L2 processing is a task that competes with other processing tasks for execution time by the UE's operating system. With this invention, the responsiveness requirements for the L2 UL software can be relaxed. Assuming that L2 enciphering is not run in advance, which means that the L2 processing time includes time to run the enciphering hardware on the critical time path, the critical time duration for L2 software processing can be doubled.

Figure 5:
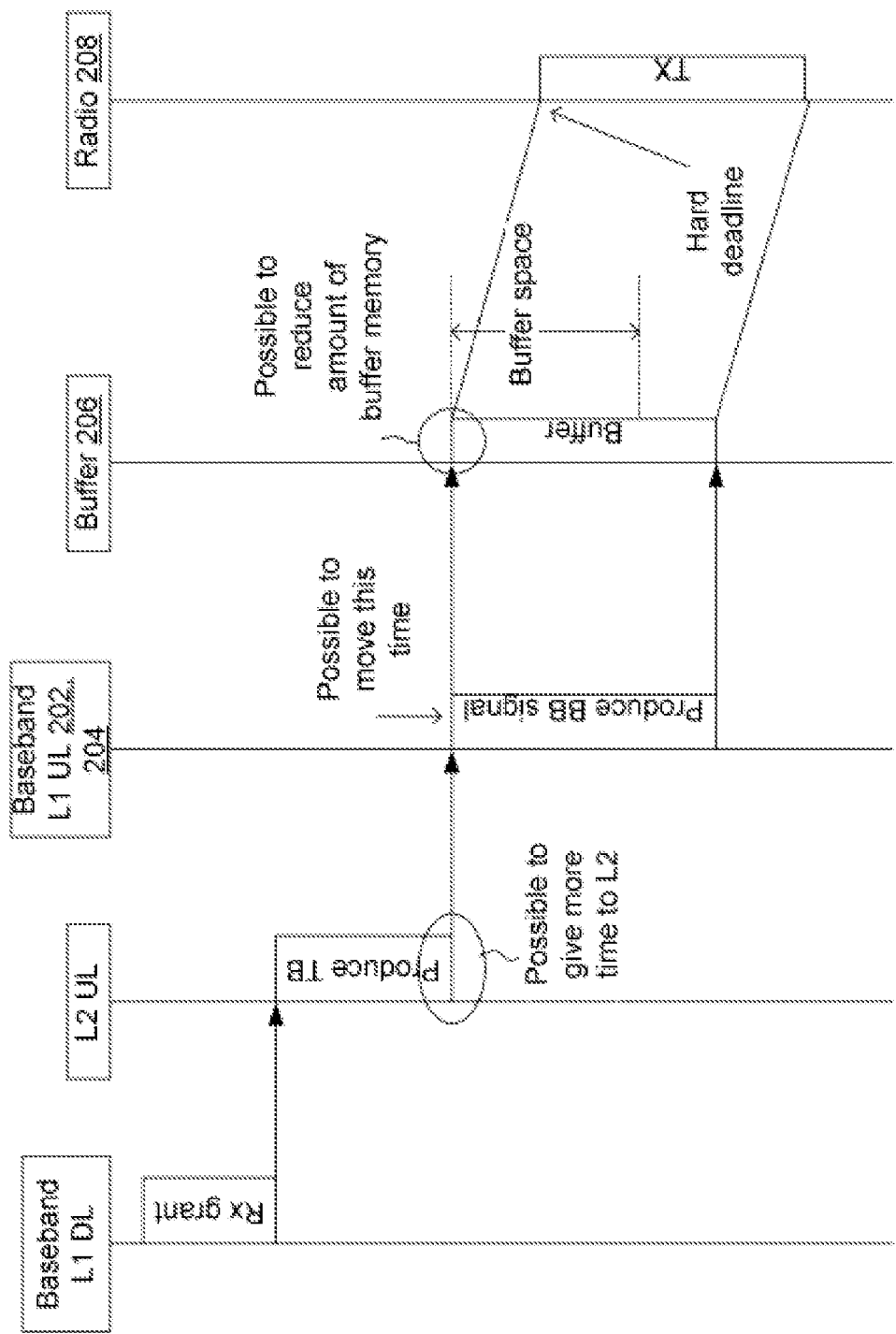
FIG. 5 is a processing sequence diagram of a user equipment.

For another example, the UE can control the size of the buffer memory 206 between the symbol generator 204 and the digital-RF circuit 208 such that it can be made smaller when the L1 execution is moved closer to the time when the actual transmission over the antenna takes place. This is depicted in FIG. 5, which is a block and processing sequence diagram of a UE. As described above, the memory 206 can be reduced by 223 kbits, which may not seem like much, but as the memory is on-chip memory, which is expensive, any reduction saves significantly. The saved memory can be allocated by the UE's control unit and operating system to other processes or tasks carried out by the UE.

Areas of improvement can be seen in FIG. 5, which shows the L2 UL processing is squeezed between the baseband L1 DL (i.e., receive) processing and the baseband L1 UL (i.e., transmit) processing 202, 204. The baseband L1 DL processing handles receiving signals transmitted by BSs, including for example signals that include an UL grant message and associated TA. Based on the received grant and TA, the UE's UL L2 processing produces one or more TBs that are processed by the UE's baseband UL processing, which includes the encoder 202 and symbol generator 204. The baseband UL signal is then stored as needed by the buffer memory 206 and passed to the baseband-to-RF processing 208 for transmission to the BS in time to meet the hard deadline imposed by the UL grant message.

Figure 6:
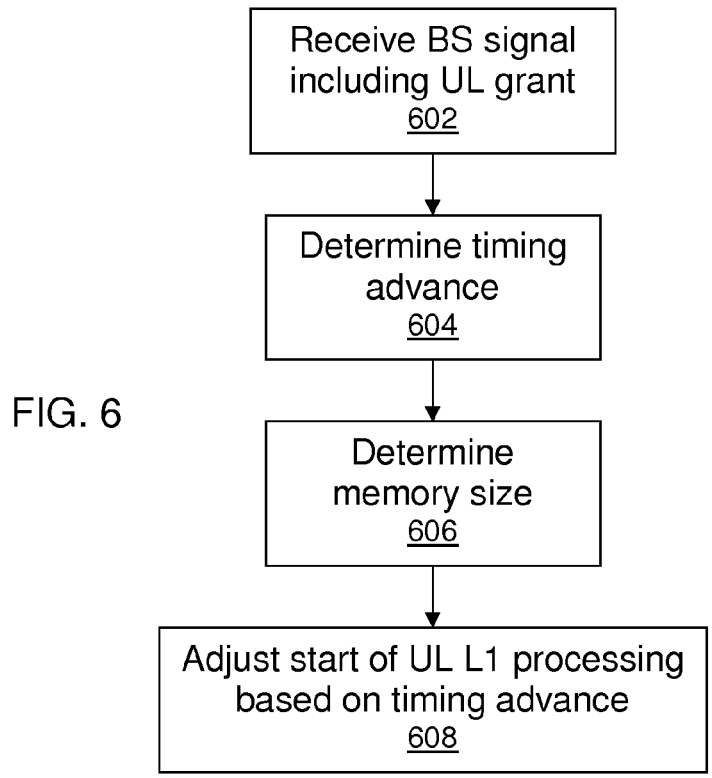
FIG. 6 is a flow chart of a method of controlling information processing in a user equipment.

FIG. 6 is a flow chart of a method of controlling information processing in a UE for a communication system as described above. In step 602, the UE receives a signal transmitted by a BS, and in step 604, the TA and a TB size are determined based on the received signal for a UL signal to be transmitted by the UE. In step 606, at least one of the start of processing information for the UL signal and a size of a buffer memory for storing the baseband UL signal is adjusted based on the determined TA and TB size. As described above, the determined TB size corresponds to the bandwidth of the UL signal, and in a communication system such as an LTE system the signal transmitted by the BS includes an UL grant message.

Figure 7:
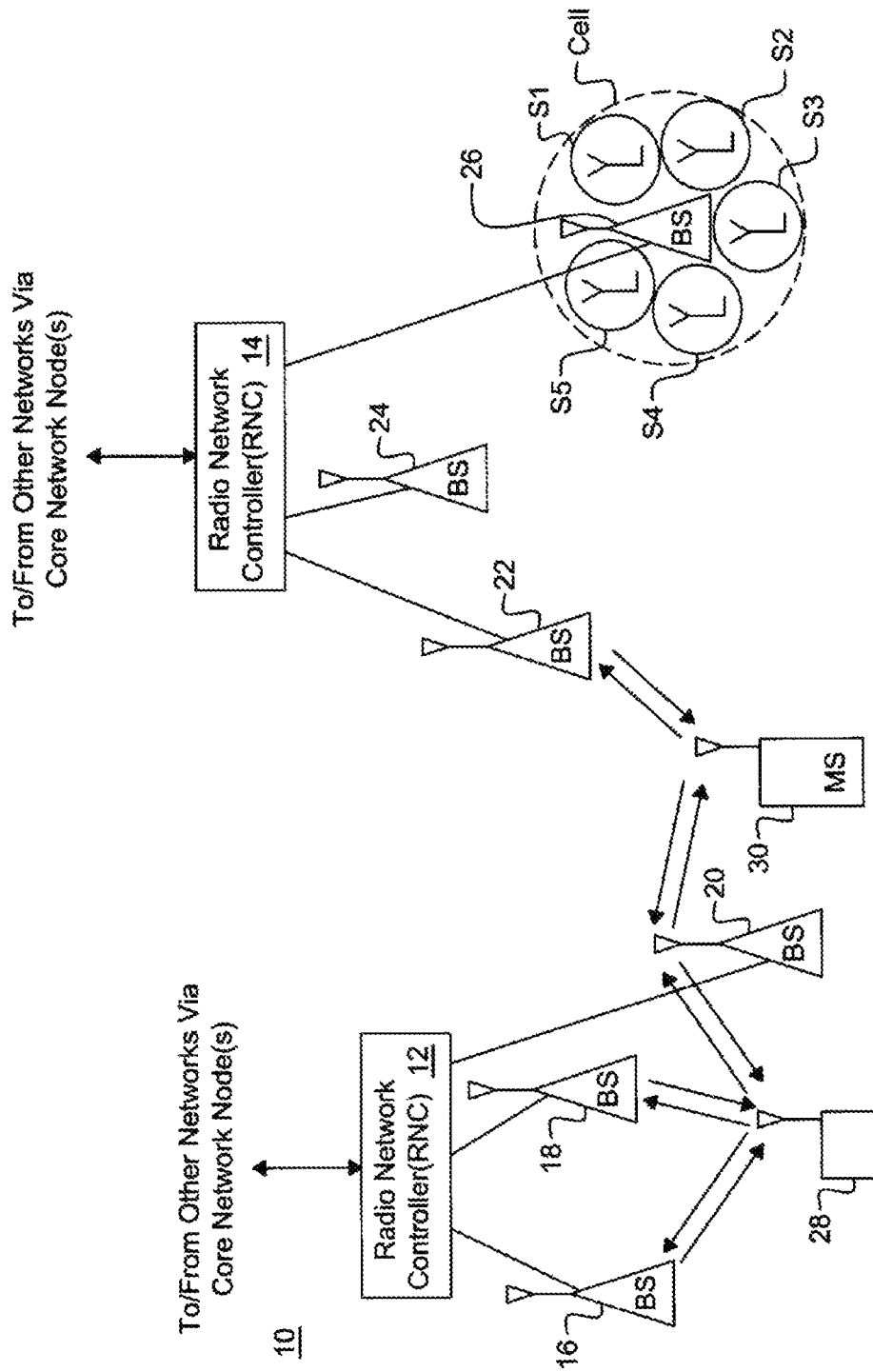
FIG. 7 is a block diagram of a cellular communication system.

FIG. 7 depicts a typical cellular communication system 10. Radio network controllers (RNCs) 12, 14 control various radio network functions, including for example radio access bearer setup, diversity handover, etc. In general, each RNC directs calls to and from a UE, such as a mobile station (MS), mobile phone, or other remote terminal, via appropriate base station(s) (BSs), which communicate with each other through DL (or forward) and UL (or reverse) channels. In FIG. 7, RNC 12 is shown coupled to BSs 16, 18, 20, and RNC 14 is shown coupled to BSs 22, 24, 26.

Each BS, or eNodeB in LTE vocabulary, serves a geographical area that is divided into one or more cell(s). In FIG. 7, BS 26 is shown as having five antenna sectors S1-S5, which can be said to make up the cell of the BS 26, although a sector or other area served by signals from a BS can also be called a cell. In addition, a BS may use more than one antenna to transmit signals to a UE. The BSs are typically coupled to their corresponding RNCs by dedicated telephone lines, optical fiber links, microwave links, etc. The RNCs 12, 14 are connected with external networks such as the public switched telephone network (PSTN), the internet, etc. through one or more core network nodes, such as a mobile switching center (not shown) and/or a packet radio service node (not shown).

It should be understood that the arrangement of functionalities depicted in FIG. 7 can be modified in LTE and other communication systems. For example, the functionality of the RNCs 12, 14 can be moved to the eNodeBs 22, 24, 26, and other functionalities can be moved to other nodes in the network. It will also be understood that a base station can use multiple transmit antennas to transmit information into a cell/sector/area, and those different transmit antennas can send respective, different UL grant and other signals.

Figure 8:
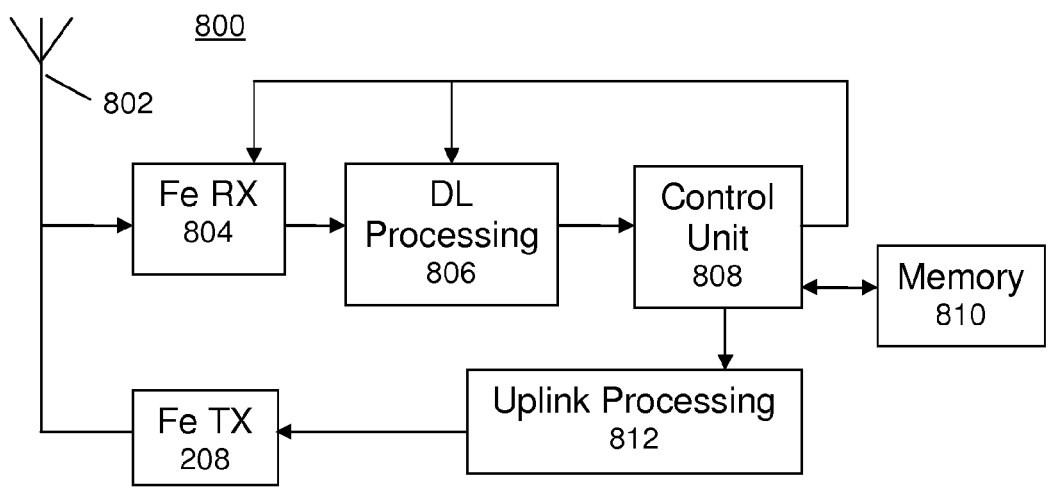
FIG. 8 is a block diagram of a portion of a user equipment in a communication system.

FIG. 8 is a block diagram of a portion of a UE 800 that is suitable for implementing the methods described above. For simplicity, only some parts of the UE 800 are shown in the figure. It will also be understood that the UE can be implemented by other arrangements and combinations of the functional blocks shown in FIG. 8.

DL signals are received through an antenna 802 and downconverted to base-band signals by a front-end receiver (Fe RX) 804. Base-band processing of a received signal is carried out by a suitably configured processing unit 806 in cooperation with a control unit 808. As needed, the control unit 808 exchanges information with a suitable memory 810, which can implement the circular buffer 206 shown in FIG. 2, and carries out needed DL processing activities specified for the wireless communication system as described above and controls of the Fe RX 804 and processor 806. The control unit 808 also cooperates with a suitably configured UL processing unit 812 and a front-end transmitter (Fe TX) 208 and other devices for sending information to the network and using received information. The artisan will understand that the processor 812 corresponds to the encoder 202 and generator 204 shown in FIG. 2, and so the control unit 808, processor 812, and Fe TX 208 carry out needed UL processing activities specified for the wireless communication system as described above.

The control unit 808 and other blocks of the UE 800 can be implemented by one or more suitably programmed electronic processors, collections of logic gates, etc. that processes information stored in one or more memories 810. The stored information can include program instructions and data that enable the control unit to implement the methods described above. It will be appreciated that the control unit typically includes timers, etc. that facilitate its operations.

It will be appreciated that procedures described above are carried out repetitively as necessary, for example, to respond to the time-varying nature of communication signals exchanged by transmitters and receivers.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless transceivers implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A method of controlling information processing in a user equipment (UE) for a communication system, comprising:
   receiving, in the UE, a signal transmitted by a base station of the communication system;
   determining, based on the received signal, a timing advance and a transport block size for a signal to be transmitted by the UE; and
   adjusting, based on the determined timing advance and the transport block size, at least one of the start of baseband Layer 1 processing information for the signal to be transmitted by the UE and a size of a memory for storing processed information for the signal to be transmitted.

2. The method of claim 1, wherein the determined transport block size corresponds to a bandwidth for the signal to be transmitted by the UE.

3. The method of claim 2, wherein the signal transmitted by the base station includes an uplink grant message and the signal to be transmitted by the UE is an uplink in a Long Term Evolution communication system.

4. An apparatus for controlling information processing in a user equipment (UE) for a communication system, comprising:
   an electronic processor configured to receive a signal transmitted by a base station of the communication system; and
   an electronic processor configured to determine, based on the received signal, a timing advance and a transport block size for a signal to be transmitted by the UE, and to adjust, based on the determined timing advance and the transport block size, at least one of the start of baseband Layer 1 processing information for the signal to be transmitted by the UE and a size of a memory for storing processed information for the signal to be transmitted.

5. The apparatus of claim 4, wherein the determined transport block size corresponds to a bandwidth for the signal to be transmitted by the UE.

6. The apparatus of claim 5, wherein the signal transmitted by the base station includes an uplink grant message and the signal to be transmitted by the UE is an uplink in a Long Term Evolution communication system.

7. A non-transitory computer-readable medium having stored instructions that, when executed by a computer, cause the computer to perform a method of controlling information processing in a user equipment (UE) for a communication system, wherein the method comprises:
   receiving, in the UE, a signal transmitted by a base station of the communication system;
   determining, based on the received signal, a timing advance and a transport block size for a signal to be transmitted by the UE; and
   adjusting, based on the determined timing advance and the transport block size, at least one of the start of baseband Layer 1 processing information for the signal to be transmitted by the UE and a size of a memory for storing processed information for the signal to be transmitted.

8. The non-transitory computer-readable medium of claim 7, wherein the determined transport block size corresponds to a bandwidth for the signal to be transmitted by the UE.

9. The non-transitory computer-readable medium of claim 8, wherein the signal transmitted by the base station includes an uplink grant message and the signal to be transmitted by the UE is an uplink in a Long Term Evolution communication system.

* * * * *

UNITED STATES PATENT AND TRADEMARK OFFICE
CERTIFICATE OF CORRECTION

| | | |
|---|---|---|
| PATENT NO. | : 8,693,447 B2 | Page 1 of 1 |
| APPLICATION NO. | : 12/718983 | |
| DATED | : April 8, 2014 | |
| INVENTOR(S) | : Lundgren | |

It is certified that error appears in the above-identified patent and that said Letters Patent is hereby corrected as shown below:

In the Specification

In Column 4, Line 35, delete "suppressed-carrier" and insert -- single carrier --, therefor.

Signed and Sealed this
Twenty-third Day of September, 2014

Michelle K. Lee
*Deputy Director of the United States Patent and Trademark Office*